Nov. 23, 1937.  G. B. HARRISON ET AL  2,100,006
PRINTING OR REPRODUCING COLOR PHOTOGRAPHS
Filed April 29, 1935
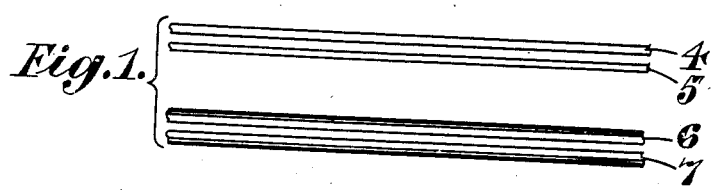
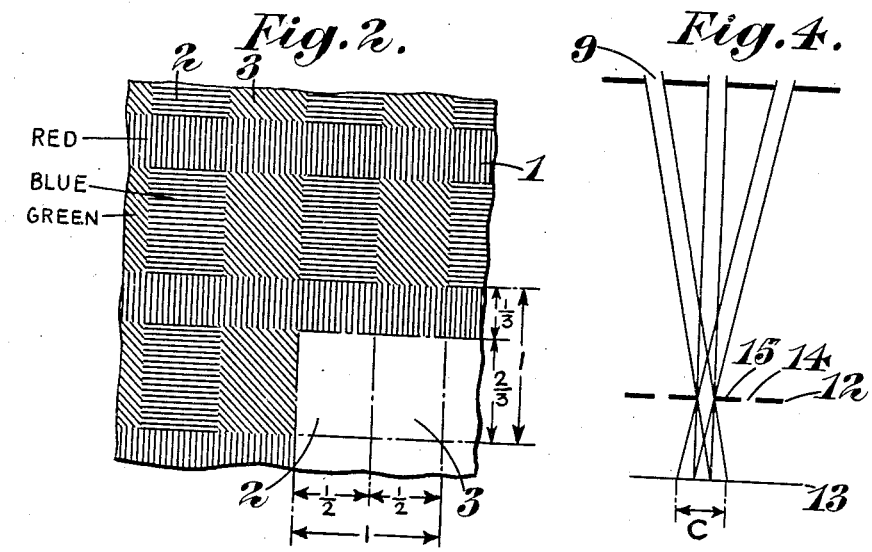
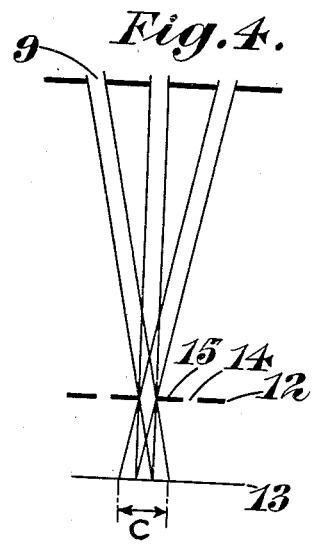
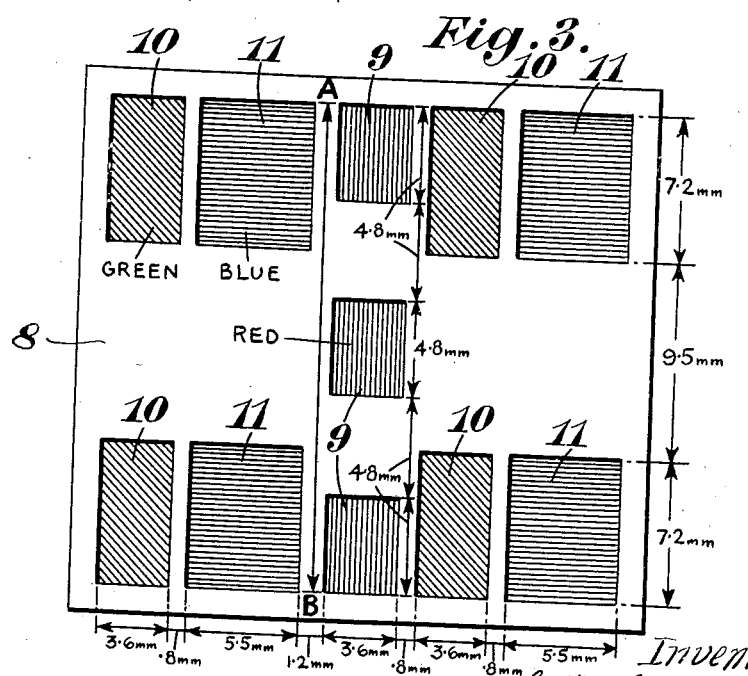

UNITED STATES PATENT OFFICE 2,100,006

PRINTING OR REPRODUCING COLOR PHOTOGRAPHS

Geoffrey Bond Harrison and Stanley Dennis Threadgold, Ilford, England, assignors, by mesne assignments, to Dufay-Chromex Limited, Aldwych, London, England Application April 29, 1935, Serial No. 18,952
In Great Britain May 2, 1934

5 Claims. (Cl. 95—75)

This invention relates to printing or reproducing color photographs of the multi-color screen type. In contact printing of photographs of this type on to a multi-color screen material, it is impossible in practice especially in cases where screens with very small multi-color elements are used, to superimpose the master and copy sufficiently accurately to ensure exact registration of the elements of the screens of the master and copy. This is especially the case with cinematograph or other films intended for enlargement.

One of the results of this lack of registration is that color degradation occurs in the copy since, considering for simplicity the case of a single color element in the master—say a red element—the light transmitted by that element may not fall wholly, or even in part, on a red element of the copy. Thus this red component of the master may not be reproduced at all on the copy or may only be reproduced in part.

This invention is concerned with photographs in which the very small color elements of the multi-color screen form regularly recurring similar pattern units but which are of uniform or non-uniform arrangement within the unit. That is to say that the elements within the unit may have areas of different shape or size. With this type of color screen (hereinafter referred to as a regularly recurring screen) the aforesaid difficulty is accentuated owing to the fact that one color area may consist of only a small part of each pattern unit.

An object of the present invention is to improve the faithfulness of the colors obtained in color printing. With this object in view the invention provides the method of photographic contact printing a master photograph on regularly recurring multi-color screen material on to multi-color screen copy material, which is characterized by the use for the printing light of a plurality of differently-colored light sources the colors of which substantially correspond to colors of the screen elements and the overall dimensions of the source of each color and the arrangement thereof being such that the light from that source passed by a master screen element of corresponding color spreads over an area on the copy screen substantially equal to the area of a group of elements forming a master screen pattern unit.

Preferably the light source of each color is subdivided into a plurality of light sources of that color. This subdivision has the advantage that a more even illumination of the copy screen is obtained and it also enables the several light sources to be arranged in a small compass. It will be understood that in contact printing in this manner, there will always be a slight spacing or small separation of the master and copy color screens, although the film or other supports for them may be in contact, and by suitable arrangement of the light sources, this spacing, although small, is sufficient to effect the required distribution of light at the copy. An additional spacing may be employed if required.

The invention includes a mask for carrying out the method described above and having a plurality of color filters of different colors spaced apart over the surface of the mask and arranged to provide, when suitably illuminated, the several light sources aforesaid.

It has already been proposed to employ a finite number of beams of white light directed in different directions through a master multi-color screen so as to produce a corresponding number of images on the copy screen each equal in size and shape to the corresponding elements of the original, but with a regularly recurring screen of the type with which this invention is concerned, this known arrangement does not ensure that the light passing through a small color element of the master screen will on the copy screen spread over an area equal to a full pattern unit area of the master screen.

One specific example of the invention will now be described with reference to the accompanying drawing in which, Figure 1 is a diagram showing the relationship during printing between the mask and the master and copy screens, Figure 2 is a greatly enlarged view of a portion of one of the multi-color screens, Figure 3 is a view of the mask, and Figure 4 is a diagram showing the spread of light over the copy screen.

This example relates to the printing of photographs on three-color screen material of the kind (hereinafter referred to as the kind described) consisting of parallel lines substantially uniformly colored in one color alternating with lines of rectangles of two different colors. A screen of this kind may be produced by the method described in U. S. Patent No. 1,805,361 and is illustrated to an enlarged scale in Figure 2 in which the lines 1 represent the red elements of the screen, the rectangles 2 the blue elements and the rectangles 3 the green elements. The relative proportions of the several elements are marked on the figure and the complete pattern unit consists of a blue rectangle, a green rectangle and a length of red line corresponding to the width of these two rectangles and forms a square 1/20 x 1/20 mm.

The arrangement adopted during printing is shown in Figure 1 in which 4 represents an evenly illuminated opal screen, 5 represents the mask (later described), 6 the master photograph and 7 the copy photograph. In this example the master and copy materials are arranged with their supports in contact, thus the master and copy screens (which are both of the kind described) are separated by two thicknesses of support material (in this case a total separation of 0.25 mm.) and the two photographic layers are outside the color screens.

The mask is shown in Figure 3 and consists of an opaque portion 8 provided with a plurality of transparent colored light filters 9, 10, and 11, the filters 9 having a light transmission similar to that of the red elements of the screen, the filters 10 having a transmission similar to that of the green elements of the screen and the filters 11 a transmission similar to that of the blue elements of the screen. The sizes of the various filters and their relative positions are marked on the figure.

In use the mask forms the printing light source and is arranged with its plane parallel to the plane of the master and copy materials and with the length A—B of the red filters in a direction at right angles to the length of the red lines of the master screen. The mask is separated from the master screen by a distance of approximately 11.5 cms. The arrangement of the red filters of the mask and the master and copy screens and the effect of the red filters of the mask during printing is shown diagrammatically in Figure 4 in which 9 represents the red filters and 12 and 13 the master and copy screens respectively. The red elements of the screen, transparent to the red light passed by the filters 9, are shown at 14 while the blue and green elements which are opaque to the red light are shown at 15. As indicated in Figure 4 the light passed by a red element of the master screen diverges before it reaches the copy screen (due to the extended form of the red filters) and the relative dimensions of the filters and screen elements and the separations of the mask and master screen and that of the two screens are so chosen that this divergence is sufficient for the light to spread on the copy film over the full width C of a master screen pattern unit i. e. the width of one red line together with the width of one line of rectangles, in this case a total of three times the width of the red line of the master screen. In the case of the red elements it is of course only necessary to spread the light in a direction transverse of the length of the elements in order to illuminate the whole of the copy screen with red light since these elements are in the form of lines.

As shown in Figure 3 the blue and green filters 10 and 11 of the mask are arranged at the corners of rectangles having sides parallel to the length A—B of the red filters. The effect of this arrangement during printing is similar to that described for the red elements in that the light transmitted by a blue or green element of the master screen is spread on the copy screen over the full width of a pattern unit of the master screen but in this case, due to the rectangular arrangement of the filters, the spreading action takes place in each direction so that the light from each blue or green element is spread over an area on the copy screen equal to the area of a full pattern unit of the master screen.

The proportions to be employed for the light sources depend in each case upon, (a) the size and shape of the several color elements of a pattern unit of the master screen, (b) the distance between the master and copy screens, and (c) the distance of the mask from the master screen.

It is found that the filter areas for a given color can be altered within small limits provided that the "centre of gravity" of each constituent area is unchanged relative to the "centre of gravity" of any other constituent area of the same color and it is the distance between the centres of gravity of the filter areas which are considered in this specification in determining the effective lengths or positions of subdivided filters. If the filter areas are altered for any color then this change must be made symmetrically for all the areas of that particular color, if the effectiveness of the mask is to be unchanged.

In order that the effect of each light source may be restricted to the master screen elements to which that source is appropriate the filters used in the filter mask are chosen so that, as far as is practicable, light transmitted by any one of the mask filters is transmitted only by the equivalent colored elements in the master screen and copy screen.

For the sake of simplicity various factors which affect the best proportions of the filters have not been considered above and it is found in practice that the best results are obtained by making small variations from the theoretical conditions described, these variations being found by trial and error. Thus for example a variation from the theoretical conditions may be introduced by the fact that the filter elements may be found each to be situated on a slightly curved surface of the support material which acts as a lens and which may be formed by the particular method of production of the screen. Other variations from the theoretical conditions may be necessary to allow for irregularities in the proportions or form of the screen elements.

Again the mask as shown in Figure 3 is provided with blue filters having somewhat larger dimensions than the green filters. The object of this is to compensate for the deficiency of blue which occurs in the usual forms of artificial printing lights. This also involves a small departure from the theoretical proportions of the filters but it enables a better practical compromise to be obtained and the invention is to be considered as including such small practical deviations from the theoretical conditions.

In the example described above the master and copy screens are separated by two thicknesses of support material but if the screens should be so arranged that only one thickness of support material separates them (i. e. separation of 0.125 mm.) then the mask having the proportions given should be only approximately 5.75 cms. away from the master screen.

Again in the example described above the mask is placed directly in front of a diffusing medium illuminated by a source or sources of light but in an alternative arrangement a lens system may be employed obviating the necessity for a diffusing medium. The light received by the diffusing medium or lens system may be white light, for example a half watt light or arc light, or it may be light provided by a system such as that described in United States patent application Serial No. 718,450, (filed March 31, 1934) or any desired combination of different light sources.

In cases where two differently colored filters partly coincide on the mask a filter (e. g. a blue-green filter) having a transmission combining both colors may be employed over the area of coincidence.

We claim:

1. The method of photographic printing a master photograph on multi-color screen material having a multi-color screen of which the color elements form regularly recurring similar pattern units but which are of irregular arrangement within the unit onto light sensitive multi-color screen copy material which comprises the step of exposing the copy material, while closely adjacent to the master, to light passed through the master from a plurality of differently colored sources, the colors of the sources being respectively similar to colors of the master screen elements and the distance of the source of each color from the master screen, the effective size of each source and the spacing of the master and copy screens being so co-related with the size of the master screen elements of color similar to the source that the light from the source passed by each master screen element of similar color spreads over an area on the copy screen substantially equal to the area of a master screen pattern unit, at least some of the spreads being different in amount in different directions.

2. The method of photographic printing a master photograph on multi-color screen material having a multi-color screen of which the color elements form regularly recurring similar pattern units but which are of irregular arrangement within the unit onto light sensitive multi-color screen copy material which comprises the step of exposing the copy material, while closely adjacent to the master, to light passed through the master from a plurality of differently colored light sources at least one of which is subdivided into spaced portions of the same color, the colors of the sources being respectively similar to colors of the master screen elements and the distance of the source of each color from the master screen, the effective size of the source and the spacing of the master and copy screens being so co-related with the size of the master screen elements of color similar to the source that the light from the source passed by each master screen element of similar color spreads over an area on the copy screen substantially equal to the area of a master screen pattern unit.

3. The method of photographic printing a master photograph made on three-color screen material of the kind consisting of parallel lines substantially uniformly colored in one color alternating with lines of rectangles of two different colors onto multi-color screen copy material which comprises the step of exposing the copy material, while closely adjacent to the master, to light passed through the master from three differently colored light sources, the colors of the light sources being respectively similar to the three colors of the master screen elements and the effective sizes of the light sources being so co-related with their distance from the master screen and the spacing between the master and copy screen that (a) the light passed by a line of the master screen from the light source of similar color spreads over an area of the copy screen having a width approximately the width of a pattern unit of the master screen measured in a direction transverse to the lines thereof, and (b) the light passed by a rectangle of the master screen from the light source of similar color spreads over an area on the copy screen approximately equal in length and breadth to the area of a pattern unit of the master screen.

4. The method of photographic printing a master photograph made on three-color screen material of the kind consisting of parallel lines substantially uniformly colored in one color alternating with lines of rectangles of two different colors onto multi-color screen copy material which comprises the step of exposing the copy material, while closely adjacent to the master, to light passed through the master from a mask placed between an illuminant and the master screen and having apertures covered by three differently colored filters each subdivided into spaced filter elements of the same color, the colors of the filters being respectively similar to the colors of the master screen and the filters having spectral transmissions which are respectively within the transmission ranges of the master elements of similar color and the effective sizes of the filters, each considered as a whole, being so co-related with the distance of the mask from the master screen and the spacing between the master and copy screens that, (a) the light passed by a line of the master screen from a filter of similar color spreads over an area on the copy screen having a width approximately the width of a pattern unit of the master screen measured in a direction transverse to the lines thereof and (b) the light passed by a rectangle of the master screen from the filter of similar color spreads over an area on the copy screen approximately equal in length and breadth to the area of the pattern unit of the master screen.

5. A mask for use in photographic contact printing a master photograph made on three-color screen material of the kind consisting of parallel lines substantially uniformly colored in one color alternating with lines of rectangles of two different colors onto multi-color screen copy material and comprising an opaque base having spaced apertures, one in the form of a strip and two others each in the general form of rectangles with one pair of sides parallel to the length of the strip, and filters covering the apertures, the color of the filter covering the strip being similar to the color of the line of a master screen pattern unit and the colors of the filters covering the rectangles being similar respectively to the colors of the two rectangular elements of a master pattern unit.

GEOFFREY BOND HARRISON.
STANLEY DENNIS THREADGOLD.